United States Patent
Aliane

(10) Patent No.: US 9,778,375 B2
(45) Date of Patent: Oct. 3, 2017

(54) X-RAY DETECTOR AND METHOD FOR ITS PRODUCTION

(71) Applicant: Commissariat á l'Énergie Atomique et aux Énergies Alternatives, Paris (FR)

(72) Inventor: Abdelkader Aliane, Grenoble (FR)

(73) Assignee: Commissariat à l'Énergie Atomique et aux Énergies Alternatives, Paris (FR)

(*) Notice: Subject to any disclaimer, the term of this patent is extended or adjusted under 35 U.S.C. 154(b) by 0 days.

(21) Appl. No.: 15/300,560

(22) PCT Filed: Feb. 17, 2015

(86) PCT No.: PCT/FR2015/050388
§ 371 (c)(1),
(2) Date: Sep. 29, 2016

(87) PCT Pub. No.: WO2015/150649
PCT Pub. Date: Oct. 8, 2015

(65) Prior Publication Data
US 2017/0176604 A1    Jun. 22, 2017

(30) Foreign Application Priority Data
Apr. 3, 2014 (FR) .................................. 14 52974

(51) Int. Cl.
*G01T 1/16* (2006.01)
(52) U.S. Cl.
CPC ................ *G01T 1/1606* (2013.01)
(58) Field of Classification Search
CPC .................................. G01T 1/1606
USPC ....................................... 250/336.1
See application file for complete search history.

(56) References Cited

U.S. PATENT DOCUMENTS 9,318,453 B2    4/2016    Aliane et al.

OTHER PUBLICATIONS

International Search Report, dated Jun. 2, 2015, from corresponding International Application No. PCT/FR2015/050388.
Bruijn et al.: "Advances in Fabrication of TES I ¼-Calorimeter Arrays and Associated Filter Structures for Ac-Biased Read Out," (2008) Journal of Low Temperature Physics, Kluwer Academic Publishers—Consultants Bureau, NE, vol. 151, No. 1-2; pp. 500-505.
Gonclaves et al.: "Flexible X-Ray Detectpr Based on Seebeck Effect," (2007) Industrial Electronics; pp. 1525-1529.
Mahadevan et al.: "Design, fabrication and characterization of an x-ray bolometer for pulsed plasma x-ray sources," (2005) Measurement Science and Technology; pp. 2287-2291.
Written Opinion, dated Jun. 2, 2015, from International Application No. PCT/FR2015/050388.

*Primary Examiner* — David Porta
*Assistant Examiner* — Gisselle Gutierrez
(74) *Attorney, Agent, or Firm* — Wolf, Greenfield & Sacks, P.C.

(57) ABSTRACT

An X-ray detector including a substrate having opposite first and second faces, at least a first temperature sensor on the side of the first or second face, and at least one stack including of a copper oxide layer and a copper layer. The copper oxide layer is located between the copper layer and the substrate. The stack covers at least partially the first temperature sensor or is at least partially opposite the first temperature sensor.

10 Claims, 3 Drawing Sheets

X-RAY DETECTOR AND METHOD FOR ITS PRODUCTION

CROSS-REFERENCE TO RELATED APPLICATIONS

This application is the national phase of International Application No. PCT/FR2015/050388, filed on Feb. 17, 2015, which claims priority to French patent application 14/52974, filed on Apr. 3, 2014, both of which applications are hereby incorporated by reference to the maximum extent allowable by law.

BACKGROUND

The present disclosure relates to an X-ray detector and to a method of manufacturing an X-ray detector.

DISCUSSION OF THE RELATED

There exist several types of X-ray detectors. So-called direct direction X-ray detectors use PN junction photodiodes or photoconductors capable of directly converting the X radiation into a measurable electric signal. So-called indirect detection X-ray detectors implement a conversion of the X radiation into another signal, which is in turn converted into a measurable electric signal.

An example of indirect detection X-ray detection comprises scintillators which convert the X radiation into a radiation at a different wavelength, for example, in the visible range. The visible luminous signal is detected by photo-detectors, which transform it into a measurable electric signal. Document "Flexible X-Ray Detector Based On the Seebeck Effect" of L. M. Goncalves, J. G. Rocha, and S. Lanceros-Mendez (IEEE, 2007, pages 1525-1529) describes a bolometer-type X-ray detector implementing an indirect detection method where the X radiation is transformed into heat in copper pads and the temperature rise is measured by a temperature sensor provided in the support of the copper pad. The method of manufacturing such an X-ray detector comprises the bonding of each copper pad onto the support.

A disadvantage of such an X-ray detector is that its manufacturing method is difficult to implement at a low cost to form a pixel array.

SUMMARY

An object of an embodiment of an X-ray detector is to overcome all or part of the disadvantages of X-ray detectors and of their previously-described manufacturing methods.

Another object of an embodiment is that the X-ray detector may be manufactured at low cost.

Another object of an embodiment is that the X-ray detector can have an array structure.

Another object of an embodiment is that the X-ray detector can be formed by printing techniques.

Another object of an embodiment is that the X-ray detector can be manufactured on a flexible substrate.

Thus, an embodiment provides an X-ray detector, comprising a substrate comprising first and second opposite surfaces, at least one first temperature sensor on the side of the first or of the second surface and at least one stack of a copper oxide layer and of a copper layer, the copper oxide layer being located between the copper layer and the substrate, the stack at least partly covering the first temperature sensor or being at least partially opposite the first temperature sensor.

According to an embodiment, the thickness of the copper layer is in the range from 5 µm to 60 µm.

According to an embodiment, the thickness of the copper oxide layer is in the range from 100 nm to 1 µm.

According to an embodiment, the first temperature sensor rests on the first surface and the copper oxide layer covers the first temperature sensor.

According to an embodiment, the detector further comprises a second temperature sensor resting on the second surface and at least partially opposite the first temperature sensor.

According to an embodiment, the detector comprises a deformable enclosure between the stack and the first temperature sensor, the enclosure containing heat-sensitive molecules capable of deforming the enclosure when the temperature exceeds a threshold temperature.

According to an embodiment, the substrate comprises a flexible film of a crystalline or semicrystalline material comprising an area at least partially covered with the first temperature sensor, and surrounded with an amorphized wall.

An embodiment also provides a method of manufacturing an X-ray detector such as defined hereabove, comprising the steps of:

providing a substrate comprising first and second opposite surfaces;

forming at least one first temperature sensor on the first or second surface side;

depositing a copper oxide pad at least partly covering the first temperature sensor or located at least partially opposite the first temperature sensor; and irradiating the copper oxide pad with an ultraviolet radiation to form, in the pad, a stack of a copper oxide layer and of a copper layer, the copper oxide layer being located between the copper layer and the substrate.

According to an embodiment, the ultraviolet radiation is applied in pulses, each pulse having a duration in the range from 500 µs to 3 ms, with a fluence in the range from 10 J/cm2 to 30 J/cm2.

According to an embodiment, the first temperature sensor is formed by printing techniques.

BRIEF DESCRIPTION OF THE DRAWINGS

The foregoing and other features and advantages will be discussed in detail in the following non-limiting description of specific embodiments in connection with the accompanying drawings, among which.

DETAILED DESCRIPTION

Figure 1:
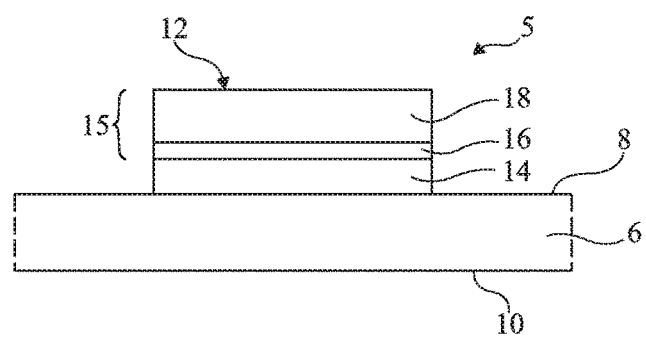
FIG. 1 is a partial simplified cross-section view of an embodiment of an X-ray detector.

For clarity, the same elements have been designated with the same reference numerals in the various drawings and, further, the various drawings are not to scale. In the following description, unless otherwise indicated, terms "substantially", "approximately", and "in the order of" mean "to within 10%". Further, only those elements which are useful to the understanding of the present description have been shown and will be described. In particular, the processing of the signals provided by the temperature sensors are well known by those skilled in the art and are not described any further.

FIG. 1 shows an embodiment of an X-ray detector 5. Detector 5 comprises a substrate 6 having two opposite surfaces 8, 10. Detector 5 further comprises at least one elementary X-ray detector 12 formed on surface 8 of substrate 6. Preferably, a plurality of elementary X-ray detectors 12 are formed on surface 8 and/or on surface 10 of substrate 6, for example, in an array of elementary detectors.

Elementary detector 12 comprises a temperature sensor 14 resting on substrate 6 and a stack 15 covering temperature sensor 14. Stack 15 comprises an interface layer 16 covering temperature sensor 14 and an X ray absorption layer 18, also called absorption pad, covering interface layer 16.

The thickness of substrate 6 may be in the range from 5 μm to 200 μm. Substrate 6 may be a rigid substrate or a flexible substrate. An example of a rigid substrate comprises a silicon, germanium, or glass substrate. An example of flexible substrate comprises a film of PEN (polyethylene naphthalate), PET (polyethylene terephthalate), PI (polyimide), or PEEK (polyetheretherketone). Preferably, substrate 6 is a flexible film. Substrate 6 may have a thickness from 10 μm to 300 μm and have a flexible behavior, that is, substrate 6 may, under the action of an external force, deform, and particularly bend, without breaking or tearing.

The function of absorption layer 18 is to absorb the X radiation, which results in a rise in the temperature of layer 18. According to an embodiment, layer 18 is made of copper and, as described in further detail hereafter, has been obtained from a copper oxide layer (CuO) exposed to an anneal with an ultraviolet radiation with ultrashort pulses. The thickness of copper layer 18 may be in the range from 5 μm to 60 μm. The use of a copper absorption layer 18 enables to detect X rays having an energy in the range from 100 eV to 30 keV.

Figure 2:
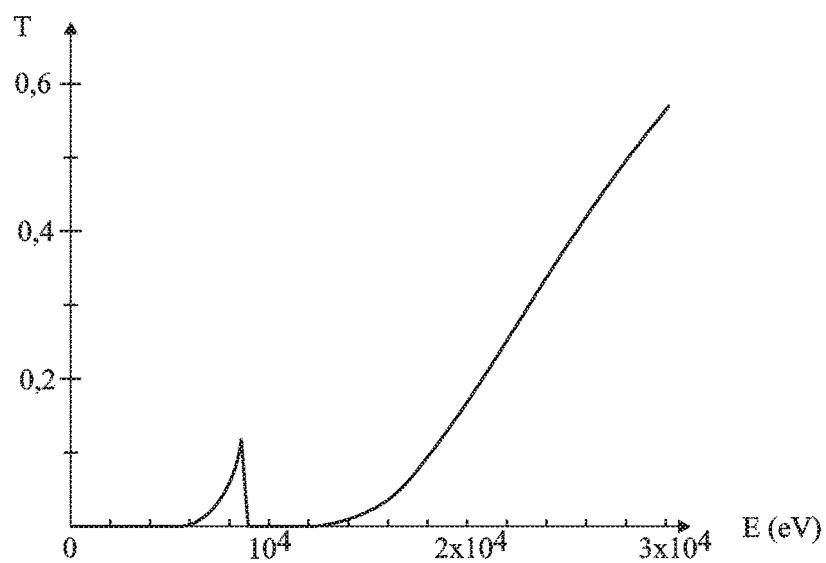
FIG. 2 shows a curve of the variation of the transmission of an X radiation in a copper layer according to the photon energy.

FIG. 2 shows a curve of the variation of the transmission of an X radiation in a copper layer according to the energy of the radiation in a copper layer having a 60-μm thickness.

Figure 3:
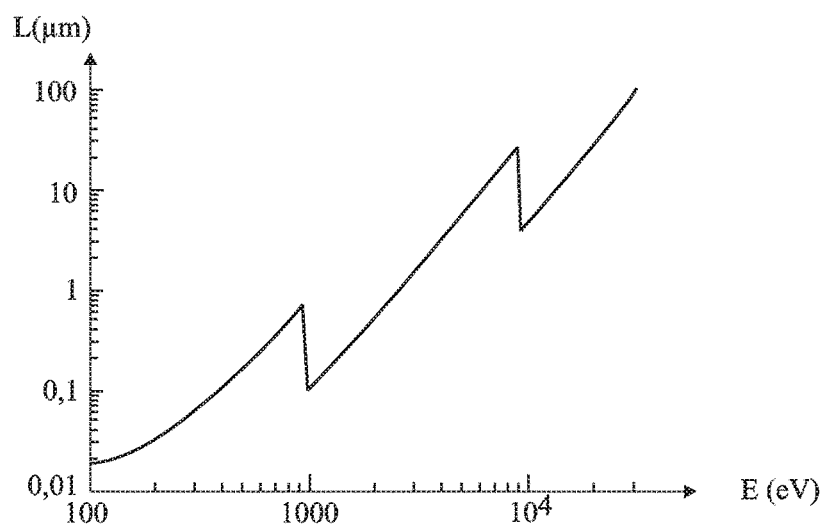
FIG. 3 shows a curve of the variation of the attenuation length of an X radiation in a copper layer according to the photon energy.

FIG. 3 shows a curve of the variation of the attenuation length of an X radiation in a copper layer according to the energy of the radiation in a copper layer.

FIGS. 2 and 3 show that the use of a copper absorption layer 18 having a thickness in the range from 5 μm to 60 μm enables to detect X rays having an energy between 100 eV and 30 keV.

The function of interface layer 16 is to electrically insulate absorption layer 18 from temperature sensor 14 while allowing a heat transfer from absorption layer 18 to temperature sensor 14. According to an embodiment, at least a portion of interface layer 16 is made of copper oxide (CuO). The thickness of copper oxide layer 16 may be in the range from 100 nm to 5 μm, preferably from 100 nm to 1 μm.

The function of temperature sensor 14 is to supply an electric signal representative of the measured temperature rise. Temperature sensor 14 may be of any type. According to an embodiment, it is a resistive-type temperature sensor. In this case, the sensor comprises one or a plurality of temperature-sensitive resistors. As an example, the resistors may be assembled in a Wheatstone bridge or in a voltage dividing bridge.

Figure 4:
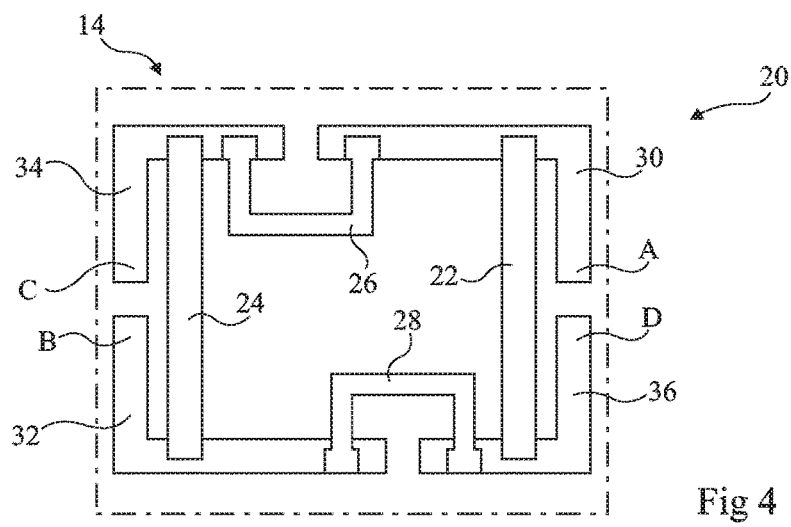
FIG. 4 is a partial simplified top view of another embodiment of a temperature sensor.

FIG. 4 is a top view of an embodiment of temperature sensor 14 comprising temperature-sensitive resistors formed by cords of resistive paste. Resistive pastes having a negative temperature coefficient, currently called NTC, may be used. NTC resistors are for example based on a metal oxide such as antimony tin oxide of chemical formula $Sb_2O_5SnO_2$, also called ATO. Other types of NTC resistors may be used, for example, inks comprising silicon or germanium nanocrystals or pastes based on graphene. Heat-sensitive resistive pastes having a positive temperature coefficient, currently called PTC, may be used. PTC resistors are currently based on carbon black. In a PTC resistor, the value of the electric resistance increases as the temperature increases. In an NTC resistor, the value of the electric resistance decreases as the temperature increases. The resistors may be formed by silk screening or jet printing techniques, where an ink is deposited on substrate 6.

According to an embodiment, a polymer is added to a conventional NTC or PTC resistor ink, for example, an ink based on $Sb_2O_5SnO_2$ for the NTC ink and an ink based on carbon black for the PTC ink. The polymer has a dielectric constant in the range from 2 to 3, a molar mass (characterizing the chain length) in the range from 50,000 g/mol to 150,000 g/mol, and a glass transition temperature Tg in the range from 40° C. to 100° C. This polymer is for example selected from the group comprising styrenic polymers and fluorinated polymers, particularly perfluorotributylamine.

According to an embodiment, temperature sensor 14 has a Wheatstone bridge structure 20 and comprises two input terminals A and B having a power supply voltage is applied therebetween and two output terminals C and D having a voltage representative of temperature measured therebetween. Wheatstone bridge 20 comprises two PTC resistors 22, 24 and two NTC resistors 26, 28 and four conductive tracks 30, 32, 34, and 36. One end of PTC resistor 22 is connected to terminal A by conductive track 30 and the other end of PTC resistor 22 is connected to terminal D by conductive track 36. One end of PTC resistor 24 is connected to terminal B by conductive track 32 and the other end of PTC resistor 24 is connected to terminal C by conductive track 34. One end of NTC resistor 26 is connected to terminal A by conductive track 30 and the other end of NTC resistor 26 is connected to terminal C by conductive track 34. One end of NTC resistor 28 is connected to terminal B by conductive track 32 and the other end of NTC resistor 28 is connected to terminal D by conductive track 36.

As an example, temperature sensor 14 is capable of detecting temperatures varying from 15° C. to 120° C. with a high sensitivity. As an example, with a power supply of the Wheatstone bridge at 4.8 V, the inventors have obtained a sensitivity in the range from 0.06 to 0.1 Volt/degree Celsius. This is necessary since temperatures resulting from the absorption of X rays are very low. A high sensitivity is thus necessary to be able to detect such low temperatures.

Figure 5A:
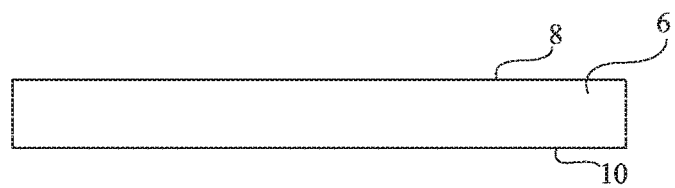
FIGS. 5A to 5F are partial simplified cross-section views of structures obtained at successive steps of another embodiment of a method of manufacturing the X-ray detector of FIG. 1.

FIGS. 5A to 5F illustrate an embodiment of a method of manufacturing sensor 5 shown in FIG. 1 comprising the steps of:

(1) preparing substrate 6, for example, a PEN or PET film (FIG. 5A). The thickness of substrate 6 may be from 50 to 300 µm, for example, 125 µm. A small thickness favors the heat transfer dynamics in the detector.

Figure 5B:
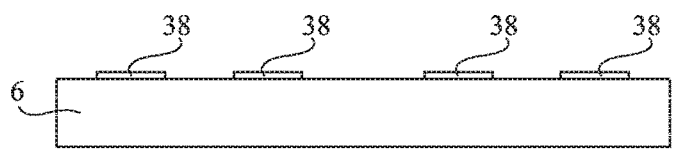

(2) Depositing and etching electrodes 38 forming the electric contacts and the conductive tracks of the temperature sensor (FIG. 5B). Electrodes 38 for example correspond to conductive tracks 30, 32, 34, 36 of the embodiment of temperature sensor 14 shown in FIG. 4. Electrodes 38 may be made of gold (Au), of copper (Cu), of silver (Ag), of titanium (Ti), or of conductive polymer, for example, poly (3,4-ethylenedioxythiophene):poly(styrene sulfonate), also called PEDOT:PSS. When electrodes 38 are metallic, they may be deposited by physical vapor deposition (PVD). When electrodes 38 are made of silver, of copper, or of conductive polymer, they may be deposited by silk screening or by inkjet.

Step (2) may be followed by a treatment under an oxygen plasma, for example with a 50-sccm flow rate and a 80-W power for 60 seconds, to remove residues from the surface and improve the adherence of heat-sensitive resistive pastes. A UV/O3 (ultraviolet/ozone) treatment of the substrate, for example, for from 3 to 5 minutes, may also be implemented.

Figure 5C:
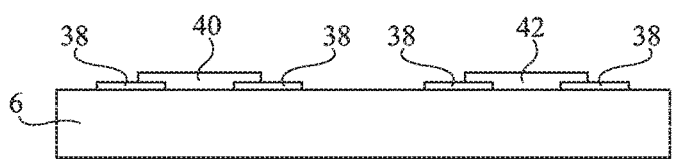

(3) Portions 40, 42 of heat-sensitive resistive pastes, possibly doped with polymer, are deposited (FIG. 5C). According to an embodiment, the portions are made of a resistive paste of same nature, NTC or PTC. According to an embodiment, the portions are made of NTC and PTC resistive pastes. In this case, the PTC resistive paste portions are formed after the NTC resistive paste portions or, conversely, the NTC resistive paste portions are formed after the PTC resistive paste portions. Portions 40, 42 of resistive pastes correspond, for example, to resistors 22, 24, 26, 28 of the embodiment of temperature sensor 14 shown in FIG. 4. Portions 40, 42 are for example in contact with certain electric tracks 38.

Each deposition may be performed by silk screening or by inkjet printing. The thickness of deposited portions 40, 42 may be in the range from 5 µm to 15 µm, for example, 10 µm.

According to an embodiment, an NTC ink used to form an NTC resistor may comprise a solution of ATO ink ($Sb_2O_5SnO_2$) and of a polymer (P) such as previously defined.

The method of preparing the NTC ink is, as an example the following. A solution of the polymer is prepared. The insulating polymer may be dissolved in a solvent having an evaporation temperature in the range from 100 to 170° C., for example, toluene (110° C. evaporation temperature), butyl acetate (118° C. evaporation temperature) for styrenic polymers, or perfluorotributylamine (FC43, 165° C. evaporation temperature) for fluorinated polymers, with the following contents with respect to the total mass of the polymer solution: from 15% to 30% by mass, for example 25%, of the polymer and from 85% to 70% by mass, for example 75%, of the solvent.

The solution of ATO ink may comprise one of the following solvents: cyclopentanone, ethyl acetate, tetrahydrofurane, 3-hexanone, 2-pentanone, or a ketone. The ATO ink solution may comprise from 20% to 80% by mass of ATO and from 20% to 80% by mass of solvent.

The obtained polymer solution is mixed with the solution of ATO ink ($Sb_2O_5SnO_2$) with proportions by mass smaller than 30%, preferably from 10% to 30% with respect to the total mass of the obtained solution containing the polymer and the ATO. The obtained solution comprising the polymer and the ATO is then stirred for from 10 to 30 minutes at ambient temperature. The proportions used to manufacture the mixture enable to adapt the viscosity to a silk screening deposition.

According to an embodiment, a PTC ink used to form a PTC resistor may comprise a solution of carbon black and of a polymer (P) such as previously defined.

The method of preparing the PTC ink is the following. A solution of the polymer is prepared as previously described for the preparation of the PTC ink.

The carbon black solution may comprise cyclopentanone, dibutyl carbitol, or diacetate ethylene glycol as a solvent. The carbon black solution may comprise from 40% to 90% by mass of carbon black and from 10% to 60% by mass of solvent.

The obtained polymer solution is mixed with the solution of carbon black with mass proportions smaller than 30%, preferably from 10% to 30% with respect to the total mass of the obtained solution containing the polymer and the carbon black. The obtained solution comprising the polymer and the carbon black is then stirred for from 10 to 30 minutes at ambient temperature. The proportions used to manufacture the mixture enable to adapt the viscosity to a silk screening deposition.

This NTC or PTC ink deposition step may be followed by a drying step to vaporize all the solvents of the polymer and ATO ink solution and/or of the polymer and carbon black solution. As an example, the drying step may be carried out at 130° C. for from 15 to 30 minutes (preferably for 30 minutes).

After drying, the obtained dry NTC ink comprises from 5% to 40%, preferably from 10% to 30%, by mass of dry polymer extract and from 60% to 95%, preferably from 70% to 90%, by mass of dry ATO extract with respect to the total mass of the dry NTC ink.

After drying, the obtained dry PTC ink comprises from 5% to 40%, preferably from 10% to 30%, by mass of dry polymer extract and from 60% to 95%, preferably from 70% to 90%, by mass of dry carbon black extract with respect to the total mass of the dry PTC ink.

Figure 5D:
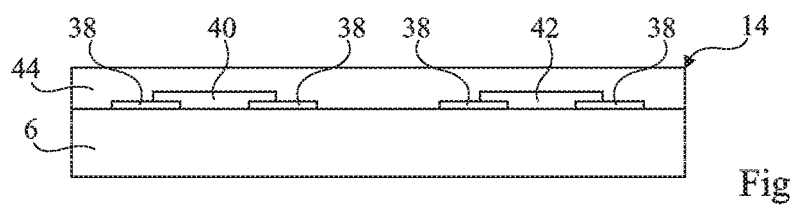

(4) A passivation layer 44 is deposited (FIG. 5D). Layer 44 may be a hydrophobic passivation layer based on a fluorinated polymer of low dielectric constant, for example, in the order of 2. As an example, this deposition is performed by silk-screening or by sputtering, or by inkjet. It may be followed by an anneal, for example, at 100° C. for from 20 to 30 minutes.

The assembly comprising electrodes 38, resistive tracks 40, 42 and passivation layer 44 forms temperature sensor 14 shown in FIG. 1.

Passivation layer 44 has two functions: protecting critical deposits, particularly resistive paste cords 40, 42, against short-circuits with the layers which will be subsequently deposited. The second function of passivation layer 44 is to have a low heat capacity. As an example, the thickness of layer 44 is in the range from 100 nm to 5 µm.

Figure 5E:
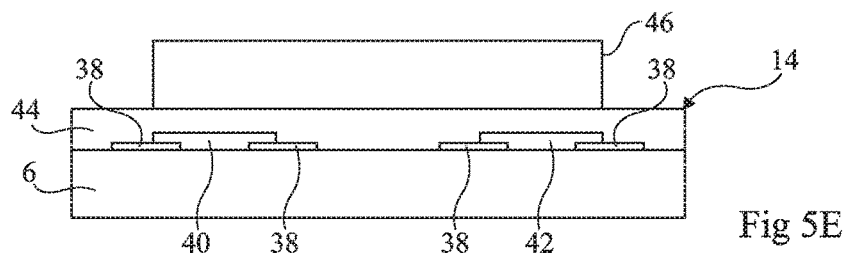

(5) A copper oxide pad (CuO) 46 is formed for each pixel of the detector (FIG. 5E). Each copper oxide pad 46 may be deposited by silk screening or by inkjet. The thickness of pad 46 may vary from 1 µm to 60 µm. The deposition step may be followed by an anneal to solidify the copper oxide, for example, at 100° C. for from 20 to 30 minutes.

An example of ink likely to be used to form copper oxide pads corresponds to the ink commercialized by Novacentrix under trade name Metallon ICI-020.

Figure 5F:
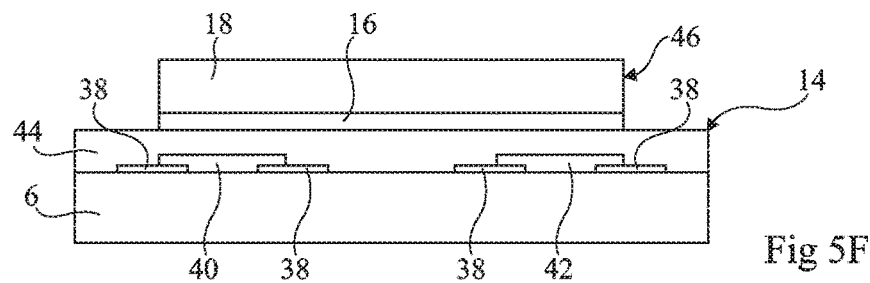

(6) An ultrashort pulse ultraviolet radiation, for example, supplied by a flash lamp, is applied to the entire structure. UV radiation means a radiation having its wavelengths at least partly in the range from 200 nm to 400 nm. The UV flash radiation enables to trigger a chemical reaction in copper oxide pad 46, which causes the reduction of the copper oxide into copper at the upper portion of each pad 46. At the end of the application of the ultraviolet radiation, pad 46 comprises an upper copper portion 18 corresponding to previously-described absorption layer and a lower copper oxide portion, interposed between absorption layer 18 and passivation layer 44, and corresponding to previously-described interface layer 16 (FIG. 5F). The thickness of the lower copper oxide portion is controlled by the parameters of the UV flash anneal, in the same way as the duration of the pulse, the fluence, and the number of pulses. As an example, the ultraviolet radiation is applied with short pulses, for example, between 500 μs and 3 ms, with a fluence in the range from 10 J/cm2 and 30 J/cm2. The total duration of the treatment may depend on the duration of each pulse and on the number of pulses.

At step (6), it is necessary to avoid reducing into copper all the copper oxide of pad 46 so that there remains interface layer 16 between passivation 44 and copper layer 18. Indeed, the direct bonding of copper on passivation layer 44 is generally of poor quality. Interface layer 16 then plays the role of a bonding layer for copper layer 18. Further, the insulation properties of passivation layer 44 may be insufficient.

According to another embodiment, step (4) may be omitted. In this case, CuO layer 16 directly rests on resistors 40, 42, electrodes 38, and substrate 6.

An advantage of the embodiment of the previously-described X-ray detector is that it can be formed on a flexible substrate which can thus be shaped according to the different envisaged applications.

Another advantage is that it is possible for the X-ray detector manufacturing method to only implement printing techniques. The X-ray detector can thus be formed at a low cost.

Another advantage is that interface layer 16 and absorption layer 18 are manufactured in a single step of the method.

Another advantage is that the previously-described manufacturing method enables to manufacture a large X-ray detector, for example comprising an array of absorption pads 18 comprising a large number of absorption pads 18 and/or comprising large absorption pads. As an example, each absorption pad 18 may, in top view in FIG. 1, be inscribed within a square having its side length measuring from 100 μm to 500 μm. As an example, detector 5 may comprise from 4 to 64 pixels.

Figure 6:
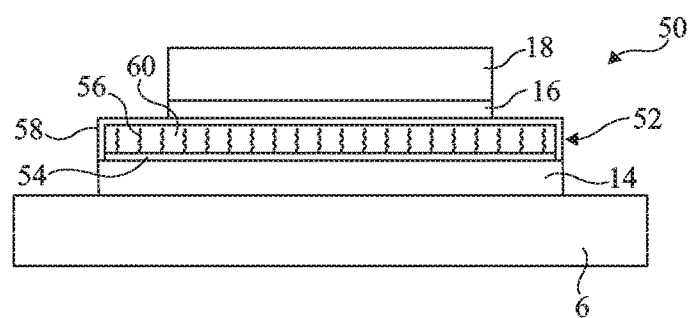
FIGS. 6 and 7 are partial simplified cross-section views of another embodiment of an X-ray detector in two operating configurations.
Figure 7:
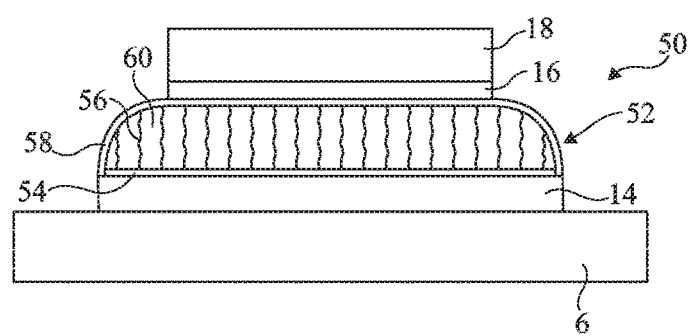

FIGS. 6 and 7 show another embodiment of an X-ray detector 50. Detector 50 comprises all the elements of detector 5 shown in FIG. 1 and further comprises a heat-actuated device 52 interposed between temperature sensor 14 and interface layer 16. Heat-actuated device 52 comprises a bonding layer 54 laid on temperature sensor 16 and having molecules 56 changing state according to temperature, called heat-sensitive molecules hereafter, bonded thereto. The nature of bonding layer 54 depends on the nature of heat-sensitive molecules 56. The thickness of bonding layer 54 may be in the range from 10 nm to 300 nm, for example, approximately 30 nm. Layer 54 may be a metal layer or a non-metal layer, for example, made of fullerene or of polystyrene.

Term heat-sensitive molecule means a polymer molecule which exhibits a significant and discontinuous change in at least one physical property according to temperature. According to an embodiment, heat-sensitive molecules 56 have a characteristic transition temperature and are in a first state, that is, with a physical property at a first level, when the temperature is lower than the characteristic transition temperature and are in a second state, that is, with a physical property at a second level, when the temperature is higher than the characteristic transition temperature. This change is preferably reversible so that the molecules pass from the first state to the second state when the temperature rises above the characteristic transition temperature and pass from the second state to the first state when the temperature decreases below the characteristic transition temperature.

According to an embodiment, the considered property is the three-dimensional conformation of the molecule. According to another embodiment, the considered property is the solubility of the molecule in a solvent. According to an embodiment, the considered property is the hydrophobicity of the molecule.

According to an embodiment, in the first state, heat-sensitive molecules 56 may have a given affinity for water, while in the second state, heat-sensitive molecules 56 may have a reverse affinity for water. For example, in the first state, heat-sensitive molecules 56 may be hydrophobic (conversely, hydrophilic) while in the second state, heat-sensitive molecules 56 may be hydrophilic (conversely, hydrophobic). More generally, heat-sensitive molecules 56 may be such that they are capable of passing from a solvophobic character (conversely, solvophilic) to a solvophilic (conversely, solvophobic) character due to a temperature variation. As an example, the material comprising heat-sensitive molecules 56 may appear in the form of an aqueous gel which occupies a first volume when the temperature is below the characteristic transition temperature and a second volume, larger than the first volume, when the temperature is above the characteristic transition temperature.

Advantageously, heat-sensitive molecules 56 may be selected from one or a plurality of the following polymers: poly(N-isopropylacrylamide) (polyNIPAM), polyvinylcaprolactame, hydroxypropylcellulose, polyoxazoline, polyvinylmethylether, polyethyleneglycol, poly-3-dimethyl (methacryloyloxyethyl) ammonium propane sulfonate (PDMAPS), and poly(propyl sulfonate dymethyl ammonium ethylmethacrylate).

The characteristic transition temperatures of these materials are the following:
polyNIPAM: between 30 and 37° C.;
polyvinylcaprolactame: 37° C.;
hydroxypropylcellulose: between 40 and 56° C.;
polyoxazoline: 70° C.;
polyvinylmethylether: 45° C.;
polyethyleneglycol: between 100 and 130° C.;
PDMAPS: between 32 and 35° C.;
poly(propyl sulfonate dimethyl ammonium ethyl methacrylate): 30° C.

For example, in the first state, heat-sensitive molecules 56 may be hydrophobic (conversely, hydrophilic) while in the second state, heat-sensitive molecules 56 may be hydrophilic (conversely, hydrophobic).

According to an embodiment, heat-sensitive molecules 56 may be formed of a plurality of types of polymers capable of being activated by temperature, in particular with different respective characteristic transition temperatures.

It is possible to modify the characteristic transition temperature of the heat-sensitive polymer by adding a salt or by adding an appropriate surface-active agent or solvent to the polymer. Similarly, a modification of the characteristic transition temperature for a family of heat-sensitive polymers may be performed by forming of a copolymer, the copolymer supporting either a filler or an amphiphilic group.

Device 50 comprises a cap 58 covering heat-sensitive molecules 56 and which defines, with temperature sensor 14, an enclosure 60 containing heat-sensitive molecules 56. Cap 58 is capable of being deformed on application of external mechanical stress. To achieve this, as an example, the thickness of cap 58 is in the range from 1 µm to 2 µm, to obtain a flexible membrane.

Preferably, cap 58 is made of a material which enables to have a good humidity input in enclosure 60. As an example, to confine water or humidity in enclosure 60, one may provide on the internal walls of enclosure 60 one or a plurality of areas having a good affinity for water such as, for example, polyimide (PI) or polydimethylsyloxane (PDMS). As an example, cap 58 is made of a material selected from the group comprising polyimide, poly(methyl methacrylate) (PMMA), poly(vinylcrotonate), and PET. Cap 58 may comprise openings for giving way to humidity.

When the temperature at the level of heat-sensitive molecules 56 exceeds a temperature threshold, this causes an increase in the volume occupied by the heat-sensitive molecules 56 and a deformation of cap 58. As an example in FIG. 7, cap 58 has been shown with an outward-bulged shape due to the increase in the volume of enclosure 60. However, the deformed shape of cap 58 may be different from the shape shown in FIG. 7. The small thickness of cap 58 advantageously provides a significant deformation of cap 58 as the volume of enclosure 60 changes.

Heat-actuated device 52 enables to modify the distance between temperature sensor 14 and absorption pad 18 according to temperature. In particular, heat-actuated device 52 enables to displace temperature sensor 14 away from or towards absorption pad 18 in the case of too high a temperature increase. This advantageously enables to electrically isolate absorption pad 18 from temperature sensor 14 and/or to improve the passing of the heat flow. The heating of the temperature sensor during the operation thereof may further contribute to actuating the heat-actuated device.

Further, heat-sensitive molecules 56 may form a shield at least partly opaque to ultraviolet radiation. A protection of the materials used to form the NTC and PTC resistors on exposure to X rays at previously-described step (6) is advantageously obtained.

According to an embodiment of a method of manufacturing heat-sensitive device 52, bonding layer 54 may be deposited by physical vapor deposition (PVD). Heat-sensitive molecules 56 may be grafted to bonding layer 54 according to the method described in A. Housni and Y. Zhao's publication entitled "Gold Nanoparticles Functionalized with Block Copolymers Displaying Either LCST or UCST Thermosensitivity in Aqueous Solution", Langmuir, 2010, 26 (15), pp. 12933-12939. Other examples of grafting methods are described in French application FR13/54701 which is considered as known and is herein incorporated by reference. Cap 58 may be formed by printing techniques, for example, by inkjet printing, or by sputtering. An anneal step enabling to evaporate the solvents having the polymers dissolved therein may be provided to form a film. The anneal step may be formed by irradiation by a succession of ultraviolet (UV) radiation pulses, or UV flashes. According to an embodiment, the duration of a UV pulse is in the range from 500 µs to 3 ms. The duration between two successive UV pulses may be in the range from 1 to 5 seconds. The fluence of the UV radiation may be in the range from 10 J/cm2 to 30 J/cm2.

Figure 8:
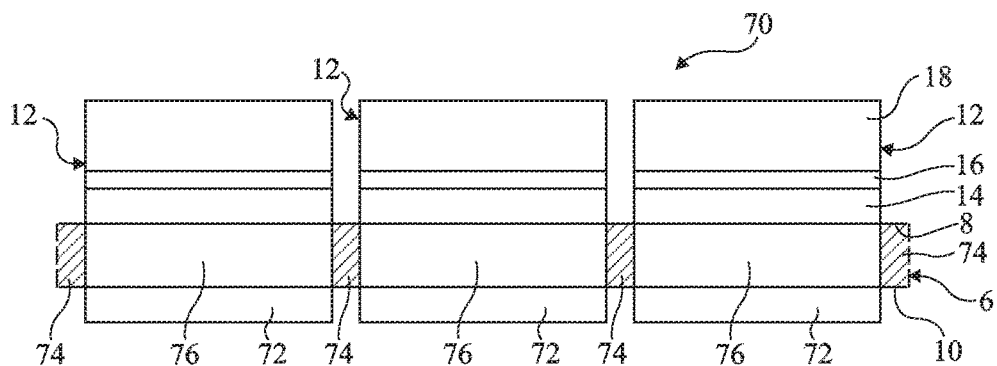
FIG. 8 is a partial simplified cross-section view of another embodiment of an X-ray detector.

FIG. 8 shows another embodiment of an X-ray detector 70. Detector 70 comprises all the elements of detector 5 shown in FIG. 1. FIG. 8 shows as an example three adjacent elementary detectors 12. Detector 70 further comprises, for each elementary detector 12, an additional temperature sensor 72 located on surface 10 of substrate 6 opposite to surface 6 having elementary detectors 12 formed thereon. According to an embodiment, each temperature sensor 12 is located substantially opposite the temperature sensor 14 of the associated elementary detector. According to an embodiment, temperature sensor 72 may have the same structure as temperature sensor 14.

According to an embodiment, substrate 6 has a thickness in the range from 10 µm to 300 µm and preferably from 5 µm to 20 µm. This advantageously enables to improve the heat transfer through substrate 6. Temperature sensors 14 and 72 enable to perform a differential temperature measurement, that is, to measure the difference between the temperature at the level of temperature sensor 14 and the temperature at the level of temperature sensor 72.

A crystalline material is a single-crystal material, that is, formed of a single homogeneous crystal, one-piece and with no grain boundary, or a polycrystalline material, that is, comprising a plurality of crystals. Further, a semicrystalline material is a material comprising crystalline areas and amorphous areas with a crystallinity rate greater than 10%, preferably greater than 20%.

It may be desirable to decrease, preferably to prevent, the lateral diffusion of heat in substrate 6 to avoid for the heat originating from an absorption pad of a specific elementary detector 12 to be detected by a temperature sensor of another elementary detector. For this purpose, according to an embodiment, walls 74 more thermally insulating than film 6 in its natural state may be provided in film 6 to delimit, for each elementary detector 12, a portion 76 of film 6 between temperature sensors 14, 72. Each wall 74 may have a width in the range from 70 µm to 200 µm, a 100-µm width being generally sufficient.

In FIG. 8, each wall 74 has been illustrated as thoroughly crossing film 6. It is possible for the penetration of wall 74 into film 6 to be only partial.

According to an embodiment, substrate 6 is a film of a crystalline material, for example, of PEN or PET. Each wall 74 may be formed by making amorphous (by amorphizing) the region of the film corresponding to wall 74. For this purpose, the region corresponding to the wall is heated above the glass transition temperature of the flexible film. For a flexible PEN film, the glass transition temperature is in the order of 120° C. and for a flexible PET film, the glass transition temperature is in the order of 60° C.

The heating step may be carried out by using an excimer laser with a power in the order of 100 watts or a short ultraviolet pulse (ultraviolet flash lasting from a few microseconds to a few milliseconds, particularly from 0.5 to 1.5 ms) by means of the device commercialized under trade name PulseForge by Novacentrix or under trade name Sinteron 2000 by Xenon Corporation. The heating may be performed only once with an excimer laser, but may have to be repeated in the case where ultraviolet flashes are used. By these various means, the temperature of the regions to be amorphized in the PEN, PET substrate is very briefly taken to a temperature in the order of 260° C., after which these regions are rapidly cooled down to be made amorphous.

Due to the presence of wall 74, the heat generated in an absorption pad 18 propagates to temperature sensor 14 and then, by crossing substrate 6, to temperature sensor 72 without affecting neighboring elementary detectors.

Specific embodiments have been described. Various alterations and modifications will occur to those skilled in the art. In particular, although in the previously-described embodiments, elementary detector 12 comprises at least one temperature sensor 14 on the same side of substrate 6 as absorption pad 18, it should be clear that it is possible for the elementary detector to only comprise a temperature sensor located on the substrate side opposite to absorption pad 18. Interface layer 16 can then directly rest on substrate 6.

Further, various embodiments with different variations have been described hereabove. It should be noted that those skilled in the art may combine various elements of these various embodiments and variations without showing any inventive step. As an example, walls 74 described in relation with FIG. 8 may be implemented with the embodiments of detectors previously described in relation with FIGS. 1 and 6.

The invention claimed is:

1. An X-ray detector, comprising a substrate comprising first and second opposite surfaces, at least one first temperature sensor on the side of the first or of the second surface and at least one stack of a copper oxide layer and of a copper layer, the copper oxide layer being located between the copper layer and the substrate, the stack at least partly covering the first temperature sensor or being at least partially opposite the first temperature sensor.

2. The detector of claim 1, wherein the thickness of the copper layer is in the range from 5 μm to 60 μm.

3. The detector of claim 1 or 2, wherein the thickness of the copper oxide layer is in the range from 100 nm to 1 μm.

4. The detector of claim 1, wherein the first temperature sensor rests on the first surface and wherein the copper oxide layer covers the first temperature sensor.

5. The detector of claim 4, further comprising a second temperature sensor resting on the second surface and at least partially opposite the first temperature sensor.

6. The detector of claim 1, comprising a deformable enclosure between the stack and the first temperature sensor, the enclosure containing heat-sensitive molecules capable of deforming the enclosure when the temperature exceeds a threshold temperature.

7. The detector of claim 1, wherein the substrate comprises a flexible film of a crystalline or semicrystalline material comprising an area at least partially covered with the first temperature sensor, and surrounded with an amorphized wall.

8. A method of manufacturing the X-ray detector of claim 1, comprising the steps of:

providing a substrate comprising first and second opposite surfaces;

forming at least one first temperature sensor on the first or second surface side;

depositing a copper oxide pad at least partly covering the first temperature sensor or being at least partially opposite the first temperature sensor; and irradiating the copper oxide pad with an ultraviolet radiation to form, in the pad, a stack of a copper oxide layer and of a copper layer, the copper oxide layer being located between the copper layer and the substrate.

9. The method of claim 8, wherein the ultraviolet radiation is applied in pulses, each pulse having a duration in the range from 500 μs to 3 ms, with a fluence in the range from 10 J/cm2 to 30 J/cm2.

10. The method of claim 8, wherein the first temperature sensor is formed by printing techniques.

\* \* \* \* \*